United States Patent
Maier et al.

[11] Patent Number: 6,071,089
[45] Date of Patent: Jun. 6, 2000

[54] HYDRAULIC DIAPHRAGM PUMP

[75] Inventors: Eugen Maier, Clarkton, Mich.; Michael Raymond Raney, Mendon, N.Y.; Donald James Moran, Rochester, N.Y.; Jeffrey Mark Noll, Honeoye Falls, N.Y.

[73] Assignee: General Motors Corporation, Detroit, Mich.

[21] Appl. No.: 09/027,121

[22] Filed: Feb. 20, 1998

[51] Int. Cl.[7] ............................... F04B 9/08; F04B 23/00
[52] U.S. Cl. ........................ 417/386; 417/388; 417/440
[58] Field of Search ................................ 417/386, 388, 417/440

[56] References Cited

U.S. PATENT DOCUMENTS

| | | | |
|---|---|---|---|
| 3,775,030 | 11/1973 | Wanner | 417/388 |
| 3,849,029 | 11/1974 | Creager et al. | 417/388 |
| 3,884,598 | 5/1975 | Wanner | 417/386 |
| 4,008,009 | 2/1977 | Kovacs et al. | |
| 4,050,859 | 9/1977 | Vork . | |
| 4,749,342 | 6/1988 | Fritsch . | |
| 4,865,528 | 9/1989 | Fritsch et al. . | |
| 5,707,219 | 1/1998 | Powers | 417/386 |

FOREIGN PATENT DOCUMENTS 61261653  11/1986  Japan .

*Primary Examiner*—Timothy S. Thorpe
*Assistant Examiner*—Michael K. Gray
*Attorney, Agent, or Firm*—John A. VanOphem

[57] ABSTRACT

A high pressure hydraulic diaphragm pump having a pressure chamber on one side of a diaphragm and a fluid delivery chamber on the other side of the diaphragm with a reciprocating piston assembly including a piston member being provided for pressurizing the hydraulic fluid in the pressure chamber and having the pressure chamber connected with a pressure regulator which maintains the desired discharge pressure of the fluid and in which the piston assembly is combined with a diaphragm positioning mechanism for maintaining the diaphragm at a desired position relative to the piston member so as to assure full stroke of the diaphragm during normal operation of the pump.

10 Claims, 6 Drawing Sheets

HYDRAULIC DIAPHRAGM PUMP

TECHNICAL FIELD

This invention concerns pumps and more particularly relates to a hydraulic diaphragm pump for use in a supply and delivery system for the direct injection of fuel at a high pressure into the cylinders of a spark-ignition internal combustion engine.

BACKGROUND OF THE INVENTION

One type of system presently used for the direct injection of a fuel into the cylinders of a spark-ignition internal combustion engine incorporates a piston type of pump in which the piston has direct contact with the fuel. One problem in using this type of pump is that the pump is relatively expensive requiring costly noncorrosive materials or coatings in order to combat the corrosive action of active chemicals and water that might be found in the fuel. Moreover, to prevent external fuel leakage, the pump needs special sealing systems for the drive shaft or may need to employ magnetic couplings or bellows type seals in order to prevent leakage. Another problem with the piston pump is that it has a limited life expectancy with the volumetric efficiency of the pump decreasing in time as the clearance between the piston and cylinder increases due to wear. At low speeds such as starting and idle, low volumetric efficiency makes it difficult to prime the system at optimal high pressure. In addition, this type of pump is very sensitive to the impurities that might be found in gasoline and a contaminated fuel could prove to be fatal to the integrity of the pump.

SUMMARY OF THE INVENTION

It is an object of the present invention to provide a solution to the above mentioned problems by providing a high pressure hydraulic diaphragm pump in which the driving mechanism is operated by an internal combustion engine at a high speed. In this type of pump, the drive mechanism includes a piston assembly that is lubricated by the hydraulic fluid and the fuel delivery side of the pump is separated from the moving parts of the pump by a flexible and impermeable diaphragm. One advantage of the diaphragm pump according to the present invention is that it provides a low cost pressure/flow generating device that does not require expensive high precision components or special heat treatments or coatings of critical parts. In addition, due to the separation of the fuel from the driving mechanism by the diaphragm, this diaphragm pump does not need special sealing or a magnetic drive to prevent fuel leakage. Moreover, this diaphragm pump is immune to contaminants in the fuel inasmuch as the fuel has no contact with the driving mechanism of the pump due to the sealing function of the diaphragm that serves to separate the fuel from the drive mechanism. The diaphragm pump also employs a hydraulic fluid regulator that provides pressure regulation in the pump and maintains the desired discharge pressure of the fuel by regulating the pressure generated by the hydraulic piston assembly by passing the hydraulic fluid through the fluid reservoir of the pump so as to allow cooling of the fluid. Thus, the diaphragm pump avoids transferring excessive heat to the fuel. In addition, in the preferred form, the present invention includes a diaphragm positioning mechanism for maintaining the diaphragm at a desired position relative to the piston member of the piston assembly so as to assure that a full stroke of the diaphragm is realized during normal operation of the hydraulic diaphragm pump.

Stated broadly, the high pressure diaphragm pump according to the present invention serves to deliver a pressurized incompressible fluid to a fluid outlet line. The pump has a housing supporting a diaphragm with a delivery chamber for the incompressible fluid on one side of the diaphragm and a pressure chamber filled with hydraulic fluid on the other side of said diaphragm. The delivery chamber is adapted to be connected to a source of the incompressible fluid by a first check valve and is adapted to be connected to the outlet line through a second check valve for providing pressurized incompressible fluid to the outlet line. The housing of the pump has a reservoir for the hydraulic fluid that serves to supply the hydraulic fluid to the pressure chamber. A piston assembly is located in the housing between the reservoir and the pressure chamber and includes a piston member adapted to be reciprocated and thereby causing the hydraulic fluid in the pressure chamber to act against the diaphragm for pressurizing the incompressible fluid in the delivery chamber for delivery through the second check valve to the outlet line at a predetermined pressure. In addition, the housing of the pump is provided with a pressure regulator between the pressure chamber and the reservoir. The pressure regulator includes a valve for connecting the pressure chamber with the reservoir and thereby permitting the hydraulic fluid in the pressure chamber to flow to the reservoir when the hydraulic fluid in the pressure chamber exceeds the predetermined pressure. The valve in the pressure regulator is provided with a pair of opposed surfaces one of which is biased by a spring located in a spring chamber, filled with hydraulic fluid, for maintaining the valve in a closed position to prevent the hydraulic fluid in the pressure chamber from being connected to the reservoir when the hydraulic fluid in the pressure chamber is at or below the predetermined pressure. The housing is provided with a first passage connecting the reservoir with the spring chamber and also has a second passage for allowing the hydraulic fluid to act against the other of the pair of surfaces against the bias of the spring and against the hydraulic fluid in the spring chamber to move the valve from the closed position to an open position so that the hydraulic fluid in the pressure chamber is connected by a third passage in the housing with the reservoir when the pressure in the pressure chamber exceeds the predetermined pressure. Also, the piston assembly includes a diaphragm positioning mechanism for maintaining the diaphragm at desired position relative to the piston member so as to assure full stroke of the diaphragm during normal operation of the hydraulic diaphragm pump.

One type of hydraulic diaphragm pump that has been proposed for use for pressurizing fluid can be seen in U.S. Pat. No. 3,849,029 in the name of Creager et al., entitled "Combination Engine Operated Fuel Pump and Air Pump", issued on Nov. 19, 1974 and assigned to the assignee of this invention. Creager et al. discloses a hydraulically operated diaphragm pump for pressurizing air. The pump has some similarity to the pump according to the present invention, however, it fails to have any form of diaphragm positioning means which permits one to realize maximum durability by not having the diaphragm contact any form of stops which could potentially cause high wear during normal operation of the pump. The U.S. Pat. No. 3,775,030 in the name of Wanner, entitled "Diaphragm Pump, and issued on Nov. 27, 1973 also discloses a diaphragm pump that also lacks a diaphragm positioning means which are incorporated with the present invention. Wanner does utilize a pressure control and unloader valve; however, the valve is incorporated with the fluid supply side of the pump rather than being combined with the pressure chamber as provided in the present invention. Having the pressure control in the form of a by-pass regulator in a supply line when pumping fuel such as gasoline (as intended for the hydraulic diaphragm pump according to the present invention) could cause major problems not the less of which would be the generation of large amounts of vapor requiring special handling such as containment or condensing means before reintroduction to the pump inlet supply. A further patent issued on May 20, 1975 to Wanner is U.S. Pat. No. 3,884,598, entitled "Piston Assembly For Diaphragm Pump". The Wanner '598 patent, although having a piston assembly which employs a complicated arrangement for positioning the diaphragm, fails to have any form of pressure regulator and therefore could not function in the manner of the present invention.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
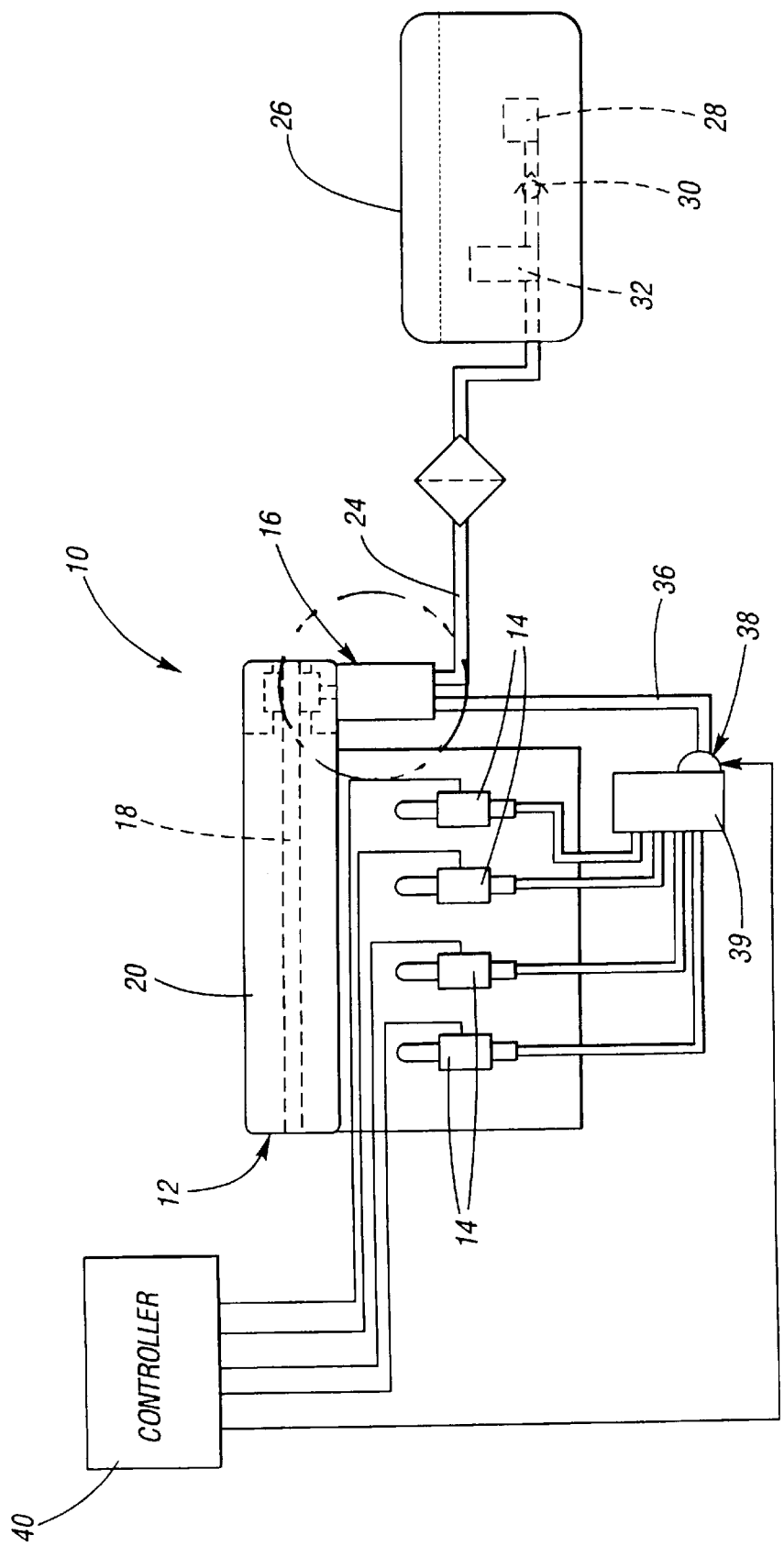
FIG. 1 is a schematic diagram of a fuel supply and delivery system having a spark-ignition internal combustion engine incorporating a hydraulic diaphragm pump in accordance with the present invention.
Figure 2:
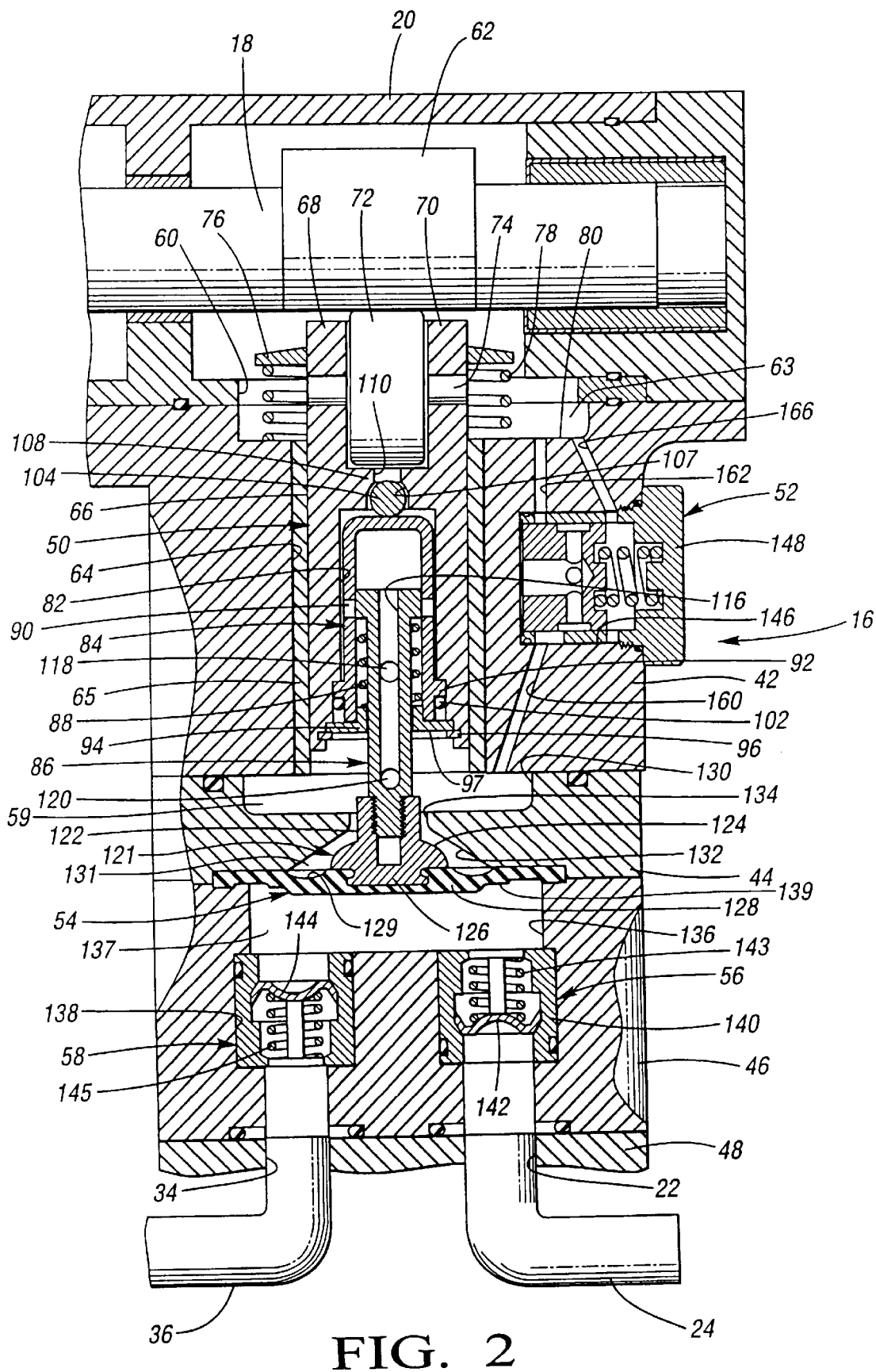
FIG. 2 is an enlarged view of the circled area in FIG. 1 showing the hydraulic diaphragm pump with parts broken away so as to illustrate the internal parts of the pump.

Referring to the drawings and more particularly to FIGS. 1 and 2 thereof, a fuel supply and delivery system 10 is shown for an automotive vehicle. The system includes a four-cylinder overhead valve spark-ignition internal combustion engine 12 in which each of the cylinders (not shown) is provided with a fuel injector 14 for direct injection of an incompressible fuel, such as gasoline, into each of the cylinders. In accordance with the present invention, a hydraulic diaphragm pump 16 is shown physically connected to the engine 12 and being driven by a camshaft 18 incorporated with the valve train mechanism (not shown) located in the valve housing 20 of the engine 12. As best seen in FIG. 2, the hydraulic diaphragm pump 16 has a fuel inlet port 22 that is connected by a line 24 to the fuel tank 26 of the system 10. A conventional fuel filter is located in the line 24 between the pump 16 and the fuel tank 26. Within the fuel tank 26, an electric pump 28 is provided which connects through a check valve 30 and a bypass regulator valve 32 with the line 24 for supplying fuel from the tank 26 to the hydraulic diaphragm pump 16. As seen in FIG. 2, the hydraulic diaphragm pump 16 also has a fuel outlet port 34 which is connected by a line 36 to an accumulator 38 equipped with a two-way normally-closed solenoid-controlled valve which serves to release stored pressure during engine start-up from the accumulator 38 to a fuel common rail 39 and the injectors 14 for improved fuel atomization and starting performance. In normal operation, the accumulator 38 maintains a desired predetermined pressure so that the fuel can be fed at a constant pressure to the common rail 39 which is connected, in turn, to four independent lines serving to feed the pressurized fuel to the individual injectors 14. The single line 36 from the hydraulic diaphragm pump 16 feeds the injectors 14 and, since only demand fuel is supplied to the injectors 14, no fuel return line is required. An electronic controller 40 is provided for controlling the accumulator 38 and also controls the opening of the injectors 14 during the operation of the engine 12. Thus, during normal operation of the engine 12, the aforementioned two-way valve will be opened by the controller 40 to allow proper accumulator function. At engine shutdown, the solenoid associated with the two-way valve will be de-energized by the controller 40 causing the valve to close and trap a volume of fuel under pressure for later release during engine start-up.

As seen in FIG. 2, the hydraulic diaphragm pump 16 includes a pump housing which consists of piston support body 42, an adapter plate 44, an inlet/outlet valve assembly plate 46, and an inlet/outlet port plate 48 the latter three of which are rigidly connected to the piston support body 42 by a plurality of fasteners (not shown). The piston support body 42 and plates 44, 46, and 48 are preferably made of a metallic material such as aluminum so as to minimize the weight of the hydraulic diaphragm pump 16.

In general, the pump housing is provided with a piston assembly 50, a pressure regulator 52, a diaphragm assembly 54, a suction valve assembly 56 and a discharge valve assembly 58 with both of the latter mentioned assemblies being mounted in the valve assembly plate 46. Also, a pressure chamber 59 is located between the piston assembly 50 and the diaphragm assembly 54. The diaphragm assembly 54 is positioned between the adapter plate 44 and the valve assembly plate 46 while the piston assembly 50 and pressure regulator 52 are located in the piston support body 42. The piston support body 42 of the hydraulic diaphragm pump 16 is sealingly connected at its upper end to the valve housing 20 and has the upper portion of the piston assembly 50 extending through an opening 60 in the valve housing 20 for operable connection with a cam 62 formed with the camshaft 18. At this junction, it will be understood that the oil used for lubricating the various parts of the engine 12 will also be used in the lubrication and operation of the hydraulic diaphragm pump 16. The intent is to have engine oil provided in the upper part of the hydraulic diaphragm pump 16 as defined by a chamber 63, serve as a reservoir at atmospheric pressure. As seen in FIG. 2, preferably the engine oil will fill the upper part of the hydraulic diaphragm pump 16 and be at a level in horizontal alignment with the plane where the piston support body 42 is joined to the valve housing 20.

More specifically, the piston support body 42 is centrally formed with a vertically orientated cylindrical bore 64 in which a cylindrical sleeve 65 made of ductile iron is press-fitted. The piston assembly 50 is located within the cylindrical sleeve 65 and includes a piston member 66 the upper end of which is formed with a pair of upstanding arms 68 and 70. A roller 72 is located between the arms 68 and 70 and is supported for rotation by a shaft 74 that extends between and is secured to the laterally spaced arms 68 and 70. A ring-shaped flange 76 extends radially outwardly from and is fixed to the piston member 66 adjacent the upper end of the arms 68 and 70 and serves as a seat for one end of a coil spring 78 the other end of which is seated on a recessed floor portion 80 adjacent the upper end of the cylindrical sleeve 65. The spring 78 serves to maintain the roller 72 and, accordingly, the piston member 66 in contact with the cam 62 during rotation of the camshaft 18.

Figure 5:
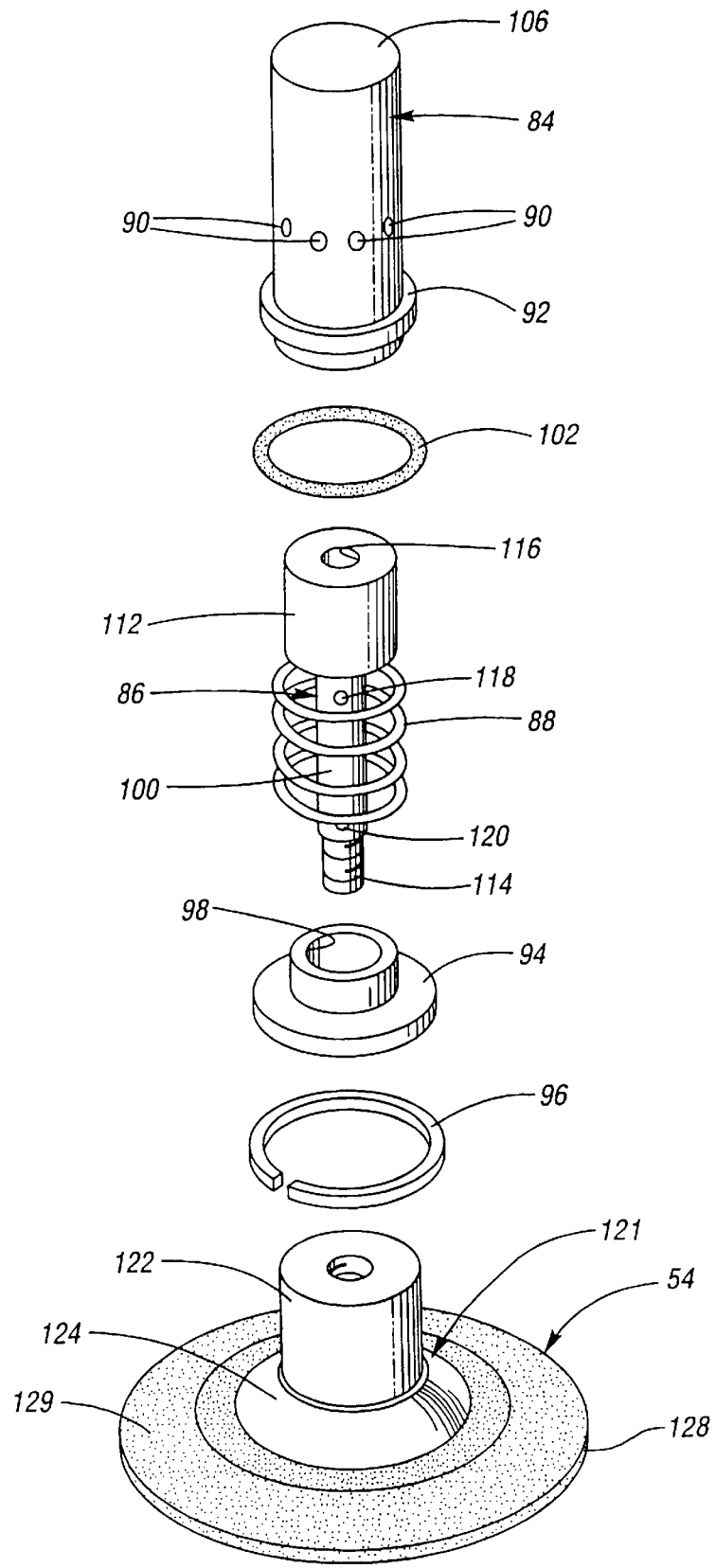
FIG. 5 is an exploded view of the diaphragm positioning mechanism which forms a part of the piston assembly of the hydraulic diaphragm pump seen in FIG. 2.

The lower portion of the piston member 66 is formed with a cylindrical bore 82 which is centered in the body of the piston member 66 and serves to accommodate a diaphragm positioning mechanism composed of an elongated and thimble-shaped sleeve 84, a plunger valve 86, and a coil spring 88. As best seen in FIGS. 2 and 5, the sleeve 84 is cylindrical in configuration and has its outer diameter dimensioned so that, when mounted in the bore 82, a uniform circumferential space or chamber is provided between the outer surface of the sleeve 84 and the inner surface of the bore 82. A plurality of radial holes 90 are formed around the body of the sleeve 84 that are located in a plane perpendicular to the longitudinal center axis of the sleeve 84 for a purpose which will be explained hereinafter. Adjacent the lower end of the sleeve 84, a radially extending flange 92 is integrally formed with the sleeve 84. When the sleeve 84 is mounted in the bore 82 as seen in FIG. 2, the flange 92 is located in a counterbore adjacent the lower end of the piston member 66 and is fixed in this position by a disk-shaped retainer 94 and a snap ring 96. The retainer 94 has a lower surface 97 and has a hole 98 centrally formed in the body of the retainer 94 through which the stem 100 of the plunger valve 86 passes. The hole 98 is of a diameter larger than the diameter of the stem 100 so that there is no interference with up-and-down movement of the plunger valve 86 relative to the sleeve 84. In addition, an "O" ring 102, mounted on the lower end of the sleeve 84, serves to seal the area between the outer surface of the sleeve 84 and the inner surface of the bore 82. A ball valve 104 is normally seated on the roof portion 106 of the sleeve 84 and is located within a semi-spherical opening 107 formed in a cross-beam 108 which forms an integral part of the piston member 66 between the roller 72 and the sleeve 84. The semi-spherical opening 107 fluidly interconnects the areas occupied by the roller 72 and the sleeve 84 through a passage 110. As will be more fully explained hereinafter, the ball valve 104 serves to open and close fluid communication between the reservoir and the pressure chamber 59 of the hydraulic diaphragm pump 16.

With further reference to FIGS. 2 and 5, the plunger valve 86 includes a head portion 112 which takes the form of a plunger and is integrally formed with the stem 100 that extends downwardly and terminates with a threaded portion 114. The head portion 112 and stem 100 have a blind passage 116 formed therein with the stem 100 being provided with two pairs of radial holes 118 and 120 that communicate with the passage 116 with each pair being located in a plane which is perpendicular to the aforementioned longitudinal center axis. The holes 118 and 120 are vertically spaced from each other so that, during normal operation of the hydraulic diaphragm pump 16, the holes 118 are located at all times within the sleeve 84 while the holes 120 are located below the piston member 66. The spring 88 has its lower end seated on the retainer 94 and has its upper end abutting the head portion 112 of the plunger valve 86 so as to bias the latter upwardly relative to the retainer 94.

The lower end of the stem 100 of the plunger valve 86 is threadably secured to the diaphragm assembly 54 which, as seen in FIG. 2, includes a metallic diaphragm retainer 121 formed with a neck portion 122 integral with a conical portion 124 and a stub portion 126. A disk-shaped diaphragm 128, made of an elastomeric material that is impervious to gasoline and the engine lubricating oil, has an upper side 129 and is molded about the stub portion 126 of the diaphragm retainer and has its peripheral edge clamped in a fixed position between the adapter plate 44 and the valve assembly plate 46. In this regard, it will be noted that the top surface of the adapter plate 44 is formed with a shallow cup-shaped well 130 while the lower surface of the adapter plate 44 is formed with a conical depression 131 with a centrally located opening 134 interconnecting the well 130 and the depression 132. The opening 134 is sized so as to be larger in diameter than the diameter of the neck portion 122 of the diaphragm retainer 121 so as to provide unobstructed fluid communication between the well 130 and the depression 131. The depression 131 is defined by a conical surface 132 which, as will be more fully explained hereinafter, has a portion thereof serving as a stop for the retianer 121.

As aforementioned, the suction valve assembly 56 and the discharge valve assembly 58 are mounted in the valve assembly plate 46. As seen in FIG. 2, the top surface of the valve assembly plate 46 is formed with circular cavity 136, which, together with the lower side of the diaphragm 128, provides a fuel delivery chamber 137. The discharge valve assembly 58 is fixed within a passage 138 that connects with the port 34 and serves to fluidly connect the cavity 136 with the line 36 leading to the accumulator 38. Similarly, the suction valve assembly 56 is fixed in a passage 140 and serves to fluidly connect the cavity 136 via port 22 with the line 24 connected with the fuel tank 26. As is conventional, the suction valve assembly 56 includes a valve member 142 biased downwardly into a closed position by a spring 143 with the spring 143 being designed to open when the fluid pressure in the line 24 acting on the valve exceeds the combined force of the spring 143 and the fluid pressure in the cavity 136. On the other hand, the discharge valve assembly 58 includes a valve member 144 biased upwardly into a closed position by a spring 145 and designed to open when the fluid pressure in the cavity 136 is greater than the combined force of the spring 145 and the fluid pressure in the line 36. Accordingly, it should be apparent that the two valve assemblies 56 and 58 are actually check valves providing fluid flow in one direction only.

Figure 3:
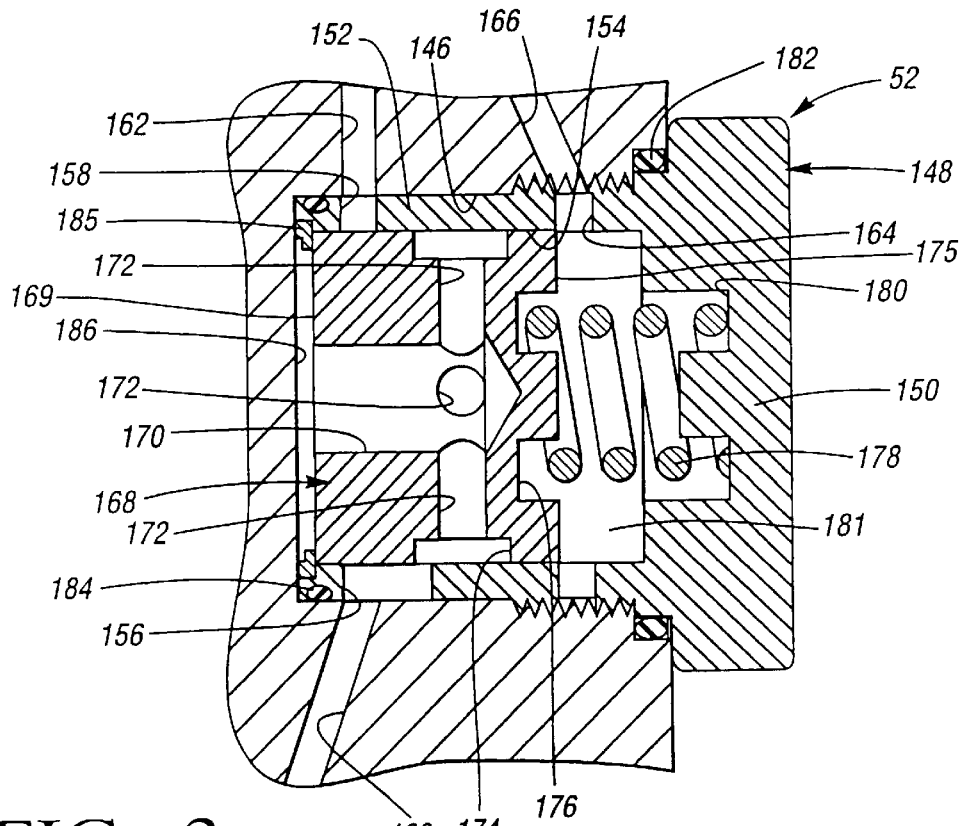
FIG. 3 is an enlarged view of the pressure regulator assembly employed by the hydraulic diaphragm pump as shown in FIG. 2 with the valve of the pressure regulator located in the closed position.

As best seen in FIGS. 2 and 3, the pressure regulator 52 is separated from the piston assembly 50 and is mounted in the piston support body 42 along one side thereof. In this regard, the pressure regulator 52 is threadably fixed within a dead-ended or blind cylindrical bore 146 and includes a valve holder member 148 having a hexagonal head 150 integrally formed with cylindrical skirt portion 152 provided with an inner cylindrical surface 154. Adjacent the free end of the skirt portion 152, a pair of diametrically opposed radially extending holes 156 and 158 are formed in the skirt portion 152. The hole 156 is larger in diameter than the hole 158 and it connects with a passage 160 which, in turn, connects with the well 130 formed in the adapter plate 44. On the other hand, the hole 158 connects with a passage 162 which, in turn connects with the reservoir of engine oil through the floor portion 80 at the upper end of the piston support body 42. Similarly, the skirt portion 152 is provided with a radially extending hole 164 adjacent the head 150. In this case, the hole 164 connects with a bleed passage 166 that also connects through the floor portion 80 with the reservoir of oil. A spool valve 168 is located within the skirt portion 152 of the valve holder member 148 and has its outer cylindrical surface in surface-to-surface contact with the inner surface 154 of the skirt portion 152. One end 169 of the spool valve 168 is formed with a centrally located and axially extending passage 170 which connects with radially extending holes 172 which, in turn, connect the passage 170 with an annular groove 174 formed in the outer cylindrical surface of the spool valve 168. As seen in FIG. 3, in the closed position of the spool valve 168, the annular groove 174 communicates with the enlarged hole 156. The other 175 end of the spool valve 168 is formed with an annular seat 176 which serves to accommodate one end of a coil spring 178, the other end of which rests within an annular seat 180 formed in the head 150 of the valve holder 148. The area between the seat 176 and seat 180 defines a spring chamber 181 that is filled with engine oil during operation of the hydraulic diaphragm pump 16. Also, as should be apparent, the spring 178 serves to maintain the spool valve 168 in the closed position seen in FIGS. 2 and 3 except under certain conditions to be described below. An "O" ring 182 at the entrance end of the bore 146 together with an elastic ring and "O" ring combination 184 serves to seal the interior of the bore 146. In addition, a snap ring 185 provided at the inner dead-end of the bore 146 to act as a stop which maintains the inner end 169 of the spool valve 168 spaced from the end wall 186 of the bore 146.

Before explaining the operation of the hydraulic diaphragm pump 16, it will be noted that, during normal operation of the pump, the diaphragm positioning mechanism serves to position the diaphragm assembly 54 so that the outer surface of the conical portion 124 of the diaphragm retainer and the diaphragm 128 are always spaced and do not contact the inclined surface 132 of the conical depression 131 in the adapter plate 44. By so doing, one is assured that the full stroke of the diaphragm 128 is utilized during operation of the hydraulic diaphragm pump 16 to maximize its volumetric efficiency. This is achieved by having the holes 90 in the sleeve 84 positioned so they are closed during normal operation of the pump 16 by the lower end of the head portion 112 of the plunger valve 86. In this position of the head portion 112, the diaphragm 128 is located in the design position and is spaced from the aforementioned surface 132 of the conical depression 132 so that the conical portion 124 of the diaphragm retainer 121 does not contact the aforementioned surface 132 of the conical depression 131 when roller 72 is at the lowest point of the cam 62. During this time, as the piston member 66 reciprocates in the piston sleeve 65, a solid column of fluid is provided that maintains the diaphragm 128 at the design position and keeps the oil in the pressure chamber 59 (area between the lower surface 97 of the retainer 94 and the top or upper side 129 of the diaphragm 128) filled under pressure. However, pump 16 will inherently have some leakage of oil occurring to the reservoir through the clearances provided for lubrication between the outer cylindrical surface of the piston member 66 and the inner cylindrical surface of the piston sleeve 65 as well as in other areas of the piston assembly 50. When such leakage occurs, the oil in the area above the head portion 112 of the plunger valve 86 will flow via the passage 116 and the holes 118 in the lower end of the stem 100 to replenish the oil lost below the piston member 66 due to leakage. At the same time, the spring 88 will cause the head portion 112 of the plunger valve 86 to move upwardly to unseal and open the holes 90 in the sleeve 84. Also, on the up or suction stroke of the piston member 66, the ball valve 104 will be seated on the roof portion of the sleeve 84 permitting oil from the reservoir to flow via passage 110 to the chamber between the inner surface of the bore 82 and the outer surface of the sleeve 84 and through the open holes 90 of the sleeve 84 and the holes 118 and 120 in the stem 100 to replenish the oil lost from the area above the head portion 112 of the plunger valve 86. This then causes the head portion 112 to move downwardly against the bias of the spring 88 to again close the holes 90 in the sleeve 84 and maintain the diaphragm at the design position. It should be noted that with the pressure chamber 59 being filled with oil and with the diaphragm 128 located at the design position, there is no mechanical connection between the piston member 66 and the diaphragm assembly 54. Instead, the oil above and below the head portion 112 of the plunger valve 86 provides a hydraulic link between the piston member 66 and the diaphragm 128.

Figure 4:
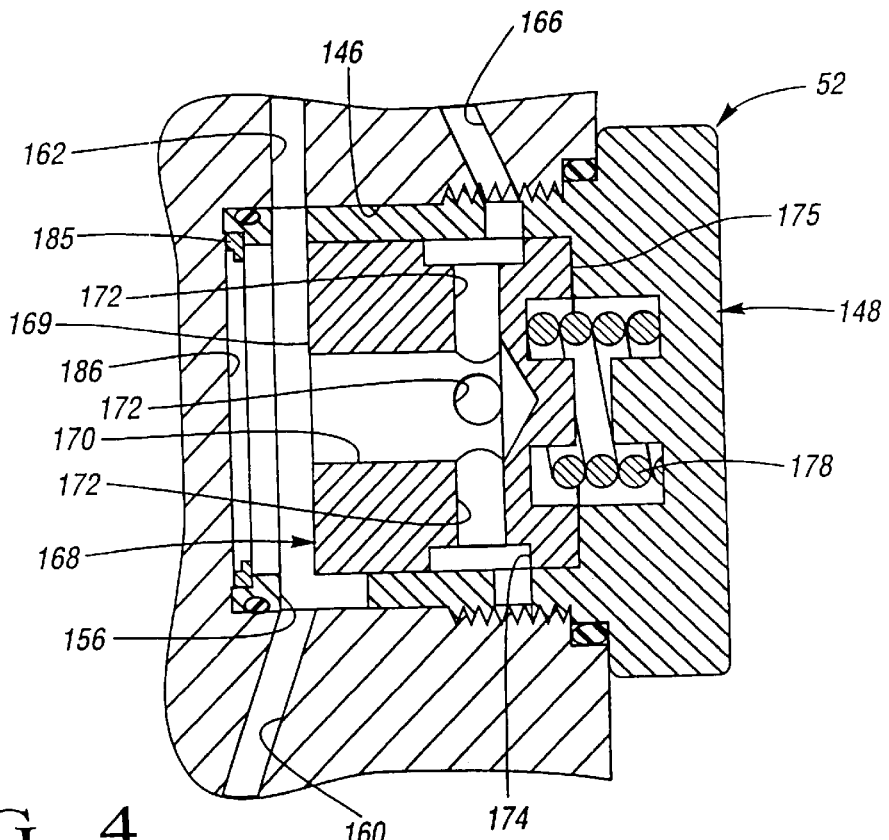
FIG. 4 is a view of the pressure regulator of FIG. 3 with the valve thereof located in the open position.

With reference to FIGS. 1 and 2, during operation of the engine 12, the electric pump 28 in the fuel tank 26 feeds gasoline to the delivery chamber 137 (defined by the cavity 136 and the lower side 139 of the diaphragm assembly 54) of the hydraulic diaphragm pump 16 via the suction valve assembly 56 at a pressure in range of 250–400 KPa to fill the delivery chamber. As the cam 62 of the rotating camshaft 18 moves from its low point to its high point against the roller 72, the piston assembly 50 moves in a downward direction against the bias of the spring 78 to provide the pump stroke. As the piston assembly 50 moves in the downward direction, the ball valve 104 will move into its semi-spherical opening 107 to close the passage 110. At the same time, the downward movement of the piston assembly 50 serves to transfer the oil from the area of the well 130 to the area of the conical depression 131 resulting in a downward movement of the diaphragm 128. This then causes the diaphragm 128 to move into the area of the delivery chamber 137 to pressurize the gasoline at a desired predetermined pressure with the result that the discharge valve assembly 58 is opened and the gasoline flows into the line 36 leading to the accumulator 38 and then, as directed by the controller 40, to the injectors 14 of the engine 12. So long as the pressurized oil in the pressure chamber 59 of the hydraulic diaphragm pump 16 remains at the desired predetermined pressure, the spool valve 168 of pressure regulator 52 will remain in the position seen in FIGS. 2 and 3 so that the passage 162 is closed by the inner end of the spool valve 168. In this regard and as seen in FIG. 3, it will be noted that when the spool valve 168 is in the closed position, the pressurized oil in the pressure chamber 59 is connected to the inner end 169 of the spool valve 168 adjacent end wall 186 through the enlarged hole 156 in the skirt portion 152 of the valve holder member 148, the annular groove 174, the holes 172 and the passage 170 in the spool valve 168. As seen in FIG. 3, the spring 178 in the spring chamber 181 will be calibrated so as to prevent the spool valve 168 from moving axially to the right unless the pressurized oil at the inner end 169 of the spool valve 168 exceeds the desired predetermined pressure. If the pressurized oil in the pressure chamber 59 of the hydraulic diaphragm pump 16 should exceed the desired predetermined pressure, the spool valve 168 will move axially to the position of FIG. 4.

As the camshaft 18 continues to rotate with the cam moving from its high point to its low point, the discharge valve assembly 58 will close and the suction valve assembly 56 will open to refill the delivery chamber 137. During this time, the pressurized gasoline in the delivery chamber 137 will act on the lower surface of the diaphragm assembly 54 and, together with the urging of the spring 78, will cause the piston assembly 50 to move upwardly. Assuming a steady state situation with no leakage between the reservoir and the pressure chamber of the hydraulic diaphragm pump 16, the pump 16 will continue to operate in this manner for pressurizing the gasoline. However, if for some reason the flow of gasoline to the accumulator 38 should be interrupted so that the delivery chamber 137 fails to discharge the gasoline and remains filled to capacity, inasmuch as the diaphragm assembly 54 will be trying to pressurize an incompressible fluid, the inability of the diaphragm assembly 54 to move downwardly into the delivery chamber 137 will cause the oil above the diaphragm assembly 54 to increase in pressure. At the same time, the downward stroke of the diaphragm assembly 54 will be decreased. As a result, the pressure in the pressure chamber 59 will exceed the desired predetermined operating pressure. As aforementioned, the pressure regulator 52 is designed so when the pressure in the pressure chamber 59 exceeds the desired predetermined pressure, the spool valve 168 will move to the position of FIG. 4. In this position of the spool valve, the oil in the pressure chamber 59 is directly connected with the reservoir via the passage 160, holes 172, and passage 170. It will be noted that, as seen in FIG. 3, as the pressure of the oil acting on the inner end of the spool valve 168 adjacent end wall 186 increases beyond the desired predetermined pressure, the spool valve 186 moves gradually to the right towards its open position due to the fact that the spring chamber 181 on the other side of the spool valve 168 is filled with oil. The passage 166 takes the form of a very small orifice measuring about one or two millimeters in diameter that controls the discharge of the oil from the spring chamber 181 to the reservoir. Thus, the pressure regulator 52 will function somewhat like a shock absorber with the passage 166 serving as an orifice controlling the speed at which the spool valve 168 moves from the closed position of FIG. 3 to the open position of FIG. 4. This will permit the hydraulic diaphragm pump 16 to continue to operate with the oil in the pressure chamber 59 being exhausted and being recirculated from the pressure chamber 59 to the reservoir and back to the pressure chamber 59 and to the reservoir until the gasoline in the delivery chamber 137 begins to flow once again to the accumulator 38. During this time, as the oil flows through the reservoir, it will be cooled and, consequently, avoids transferring excessive heat to the fuel. Moreover, during high-speed and low-load operation of the engine 12, the pressure regulator 52 will be active in relieving excessive pressure generated by the pumping action of the piston assembly 50.

During engine shut-down, the inherent leakage in the pump 16 will cause the pressure in the pressure chamber 59 to drop to atmospheric pressure with the result that the diaphragm assembly 54 will move upwardly under the urging of the pressurized fuel in the delivery chamber and spring 88. The upward movement of the diaphragm assembly 54 will continue until the conical portion 124 of the diaphragm assembly 54 contacts the upper end of the conical depression surface adjacent the opening 134 of the adapter plate 44. Thus, the surface 132 of the conical depression 131 serves as a "stop" and, as a result, the engagement of the two members prevents suction pressure during engine start-up from stretching and damaging the diaphragm 128. Once the pressure in the pressure chamber 59 is at the desired predetermined pressure once again, the spool valve 168 will return to the closed position of FIG. 3 with the oil in the spring chamber 181 being replenished by leakage around the spool valve 168.

Figure 6:
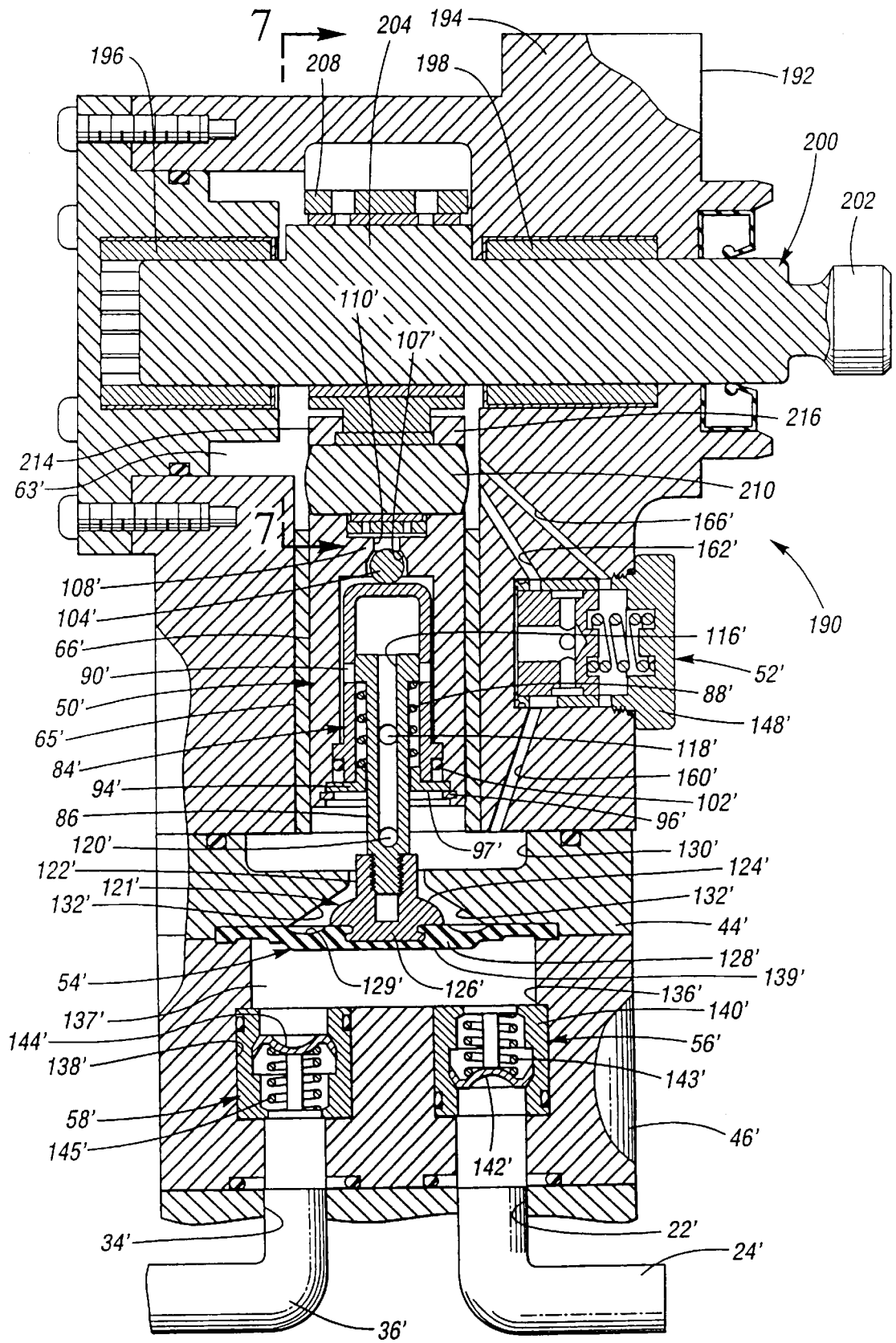
FIG. 6 is a view similar to that of FIG. 2 of a modified hydraulic diaphragm pump in which the camshaft drive mechanism of the pump is an integral part of the pump.
Figure 7:
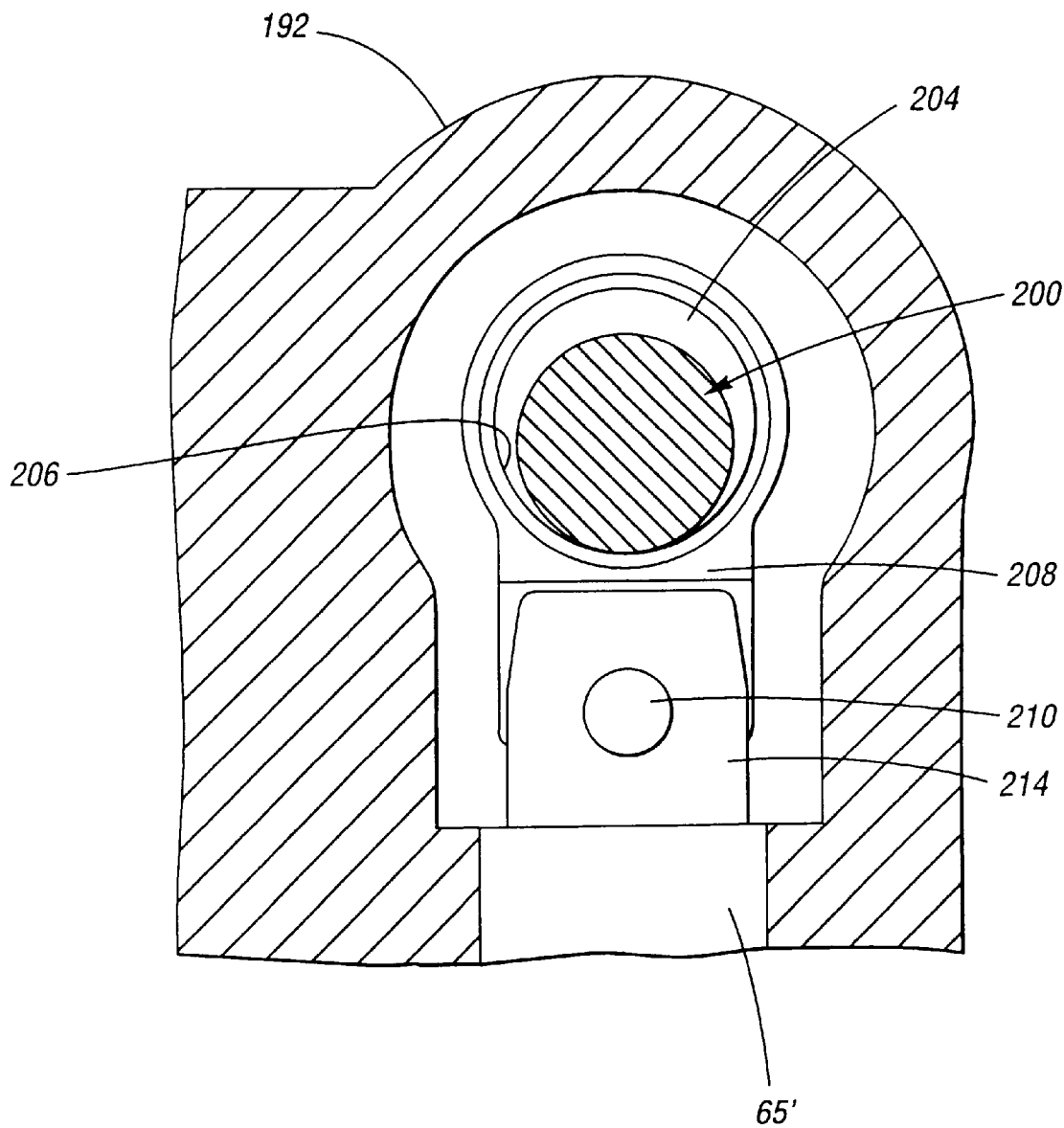
FIG. 7 is a sectional view taken on line 6—6 of FIG. 6 showing the driving connection between the camshaft of the piston assembly of the pump.

FIGS. 6 and 7 disclose a hydraulic diaphragm pump 190 which is identical in construction to the hydraulic diaphragm pump 16 of FIGS. 1–5 except for having the camshaft drive arrangement incorporated as an integral part of the pump unit rather than using the camshaft of the engine valve train mechanism as the drive member. Accordingly, those parts of the hydraulic diaphragm pump 190 that are identical in construction to the parts of the hydraulic diaphragm pump 16 of FIGS. 1–5 will be identified by the same reference numerals except primed.

As seen in FIGS. 6 and 7, the hydraulic diaphragm pump 190 is provided with a piston support body 192 that is integrally formed with a camshaft housing 194 which includes a pair of axially spaced bearing assemblies 196 and 198 for supporting a camshaft 200 for rotation. The free end of the camshaft 200 is formed with a boss 202 that can be provided with a pulley mounted thereon and be driven through a drive belt by the crankshaft of an internal combustion engine. Located between the opposed ends of the camshaft 200 is a cam 204 which, as seen in FIG. 7, is mounted in the circular opening 206 of a connecting rod 208 the lower end of which is connected by a piston pin 210 to the a piston member 212. The piston member 212 is essentially identical in construction to the piston member 66 of the pump 16 except that a larger hole is formed in the spaced arms 214 and 216 for accommodating the piston pin 210 rather than having a shaft for a roller as provided in the pump 16. It will be noted that all parts of the pump below the piston pin 210 are identical to those described in connection with the pump 16. Accordingly, the description of those parts need not be repeated here. As should be apparent, a hydraulic fluid such as oil would be provided in the camshaft housing 194 and have the reservoir thereof vented to atmosphere. Also it will be understood, that driving rotation of the camshaft 200 will cause all parts of the pump 190 to operate in the same manner as the corresponding parts of the pump 16 with the connection provided by the connecting rod 208 between the piston member 66' replacing the spring 78 of the pump 16.

Each of the hydraulic diaphragm pumps 16 and 190 described above are intended to generate a constant pressure in line 36 of approximately 10 MPa as the engine is operating between idle and full speed. During such time the demand for the fuel will vary depending upon the speed of the vehicle and the load on the engine. In usage, as engine demand for fuel flow increases, the pumps 16 and 190 will respond by increasing fuel flow to maintain a constant pressure in line 36. Increased fuel flow will be achieved by increasing the stroke of the diaphragm assembly 54, 54' at which time the pressure regulator 52, 52' will maintain the closed position of FIG. 3. When the engine demand later changes to a minimum or lesser fuel flow condition (which could occur when the vehicle is at idle speed), the pump 16 and 190 will respond by decreasing the amount of fuel being delivered to the accumulator 38 to maintain a constant pressure in line 36. This is accomplished by the pressure regulator 52, 52' sensing the increase of pressure in the pressure chamber 59' and permitting the oil in the pressure chamber 59' to flow via the pressure regulator into the reservoir. Obviously, during this time the stroke of the diaphragm assembly 54, 54' is decreased, as described above, resulting in a decrease in fuel flow.

From the above description, it should be apparent that, as seen in FIG. 1, the pump 16 will supply only that fuel which is required by the engine 12. It accomplishes this by changing oil flow to maintain a constant pressure as fuel flow to the engine varies. The pressure regulator 52 on the oil side of the pump 16 maintains a constant pressure on the oil side by by-passing oil back to the reservoir. The hydraulic coupling of the fuel and oil directly translates the pressure generated on the oil side to the fuel. Also, the single line 36 from the pump 16 feeds the fuel rail 39. Since only demand fuel is supplied, no fuel return line is required in the line 36.

Various changes and modifications can be made in the above described hydraulic diaphragm pumps without departing from the spirit of the invention. Such changes and modifications are contemplated by the inventors and they do not wish to be limited except by the scope of the appended claims.

What is claimed is:

1. A high pressure diaphragm pump for use in delivering a pressurized incompressible fluid to a fluid outlet line, said pump having a housing supporting a diaphragm with a delivery chamber for said incompressible fluid on one side of said diaphragm and a pressure chamber filled with hydraulic fluid on the other side of said diaphragm, said delivery chamber adapted to be connected to a source of said incompressible fluid by a first check valve and adapted to be connected to said outlet line through a second check valve for providing pressurized incompressible fluid to said outlet line, said pump housing having a reservoir for said hydraulic fluid for supplying said hydraulic fluid to said pressure chamber, a piston assembly in said housing and being located between said reservoir and said pressure chamber, said piston assembly having a piston member connected by a retainer to said diaphragm and adapted to be reciprocated to thereby cause said hydraulic fluid in said pressure chamber to act against said diaphragm for pressurizing said incompressible fluid in said delivery chamber for delivery through said second check valve to said outlet line at a predetermined pressure, said housing having a depression formed therein defined by a conical surface and serving as a portion of said pressure chamber, said retainer of said diaphragm being located in said depression adjacent said conical surface and adapted to contact said conical surface to stop movement thereof only when said pump is not operating and the pressure in said delivery chamber exceeds the pressure in said pressure chamber, said piston member being a part of a diaphragm positioning mechanism for maintaining said retainer spaced from said conical surface during normal operation of said pump, and a pressure regulator provided in said housing between said pressure chamber and said reservoir, said pressure regulator including a valve having opposed ends, said pressure regulator having a fluid chamber at one end of said opposed ends including means for biasing said valve in one direction, said housing having a first passage for connecting said fluid chamber with said hydraulic fluid in said reservoir and having a second passage for continuously connecting said pressure chamber with the other end of said opposed ends, said housing having a third passage adapted for connecting said pressure chamber with said reservoir under certain conditions, the arrangement being such that when said pressure in said pressure chamber is at or below said predetermine pressure said valve is in a first position to close said third passage and when said pressure in said pressure chamber exceeds said predetermined pressure said valve is moved to a second position against the bias of the fluid and said means in said fluid chamber so as to cause the fluid in the pressure chamber to flow via said first passage and said third passage to said reservoir, said first passage being substantially smaller in size than said third passage so that quick movement of said valve is resisted by the hydraulic fluid in said fluid chamber as said valve moves from said first position to said second position.

2. A high pressure diaphragm pump for use in delivering a pressurized incompressible fluid to a fluid outlet line, said pump having a housing supporting a diaphragm with a delivery chamber for said incompressible fluid on one side of said diaphragm and a pressure chamber filled with hydraulic fluid on the other side of said diaphragm, said delivery chamber adapted to be connected to a source of said incompressible fluid by a first check valve and adapted to be connected to said outlet line through a second check valve for providing pressurized incompressible fluid to said outlet line, said pump housing having a reservoir for said hydraulic fluid for supplying said hydraulic fluid to said pressure chamber, a piston assembly in said housing and being located between said reservoir and said pressure chamber, said piston assembly having a piston member connected by a retainer to said diaphragm and adapted to be reciprocated to thereby cause said hydraulic fluid in said pressure chamber to act against said diaphragm for pressurizing said incompressible fluid in said delivery chamber for delivery through said second check valve to said outlet line at a predetermined pressure, said housing having a depression formed therein defined by a conical surface and serving as a portion of said pressure chamber, said retainer of said diaphragm being located in said depression adjacent said conical surface and adapted to contact said conical surface to stop movement thereof only when said pump is not operating and the pressure in said delivery chamber exceeds the pressure in said pressure chamber, said piston member being a part of a diaphragm positioning mechanism for maintaining said retainer spaced from said conical surface during normal operation of said pump, and a pressure regulator provided in said housing between said pressure chamber and said reservoir, said pressure regulator including a valve having opposed ends, said pressure regulator having a fluid chamber at one end of said opposed ends, a spring located in said fluid chamber for maintaining said valve in a first closed position to prevent said hydraulic fluid in said pressure chamber from being connected to said reservoir, said housing having a first passage for connecting said fluid chamber with said hydraulic fluid in said reservoir and having a second passage for continuously connecting said pressure chamber with the other end of said opposed ends, said housing having a third passage adapted for connecting said pressure chamber with said reservoir under certain conditions, the arrangement being such that when said pressure in said pressure chamber is at or below said predetermine pressure said valve is in said first position to close said third passage and when said pressure in said pressure chamber exceeds said predetermined pressure said valve is moved to a second position against the bias of said spring and the fluid in said fluid chamber so as to cause the fluid in the pressure chamber to flow via said first passage and said third passage to said reservoir, said first passage being substantially smaller in size than said third passage so that quick movement of said valve is resisted by the hydraulic fluid in said fluid chamber and said spring as said valve moves from said first position to said second position.

3. A high pressure diaphragm pump for use in delivering a pressurized incompressible fluid to a fluid outlet line, said pump having a housing supporting a diaphragm with a delivery chamber for said incompressible fluid on one side of said diaphragm and a pressure chamber filled with hydraulic fluid on the other side of said diaphragm, said delivery chamber adapted to be connected to a source of said incompressible fluid by a first check valve and adapted to be connected to said outlet line through a second check valve for providing pressurized incompressible fluid to said outlet line, said pump housing having a reservoir for said hydraulic fluid for supplying said hydraulic fluid to said pressure chamber, a piston assembly in said housing and being located between said reservoir and said pressure chamber, said piston assembly having a piston member connected by a retainer to said diaphragm and adapted to be reciprocated to thereby cause said hydraulic fluid in said pressure chamber to act against said diaphragm for pressurizing said incompressible fluid in said delivery chamber for delivery through said second check valve to said outlet line at a predetermined pressure, said housing having a depression formed therein defined by a conical surface and serving as a portion of said pressure chamber, said retainer of said diaphragm being located in said depression adjacent said conical surface and adapted to contact said conical surface to stop movement thereof only when said pump is not operating and the pressure in said delivery chamber exceeds the pressure in said pressure chamber, said piston member being a part of a diaphragm positioning mechanism for maintaining said retainer spaced from said conical surface during normal operation of said pump, said diaphragm positioning mechanism having a sleeve fixed to said piston member and having at least one opening formed therein for connection with said reservoir, a plunger valve located in said sleeve for closing said opening so as to prevent communication through said opening between said pressure chamber and said reservoir so as to maintain said retainer spaced from said conical surface at all times during normal operation of said high pressure diaphragm pump, and a pressure regulator provided in said housing between said pressure chamber and said reservoir, said pressure regulator including a spool valve having opposed ends, said pressure regulator having a fluid chamber at one end of said opposed ends, a spring located in said fluid chamber for maintaining said valve in a first closed position to prevent said hydraulic fluid in said pressure chamber from being connected to said reservoir, said housing having a first passage for connecting said fluid chamber with said hydraulic fluid in said reservoir and having a second passage for continuously connecting said pressure chamber with the other end of said opposed ends, said housing having a third passage adapted for connecting said pressure chamber with said reservoir under certain conditions, the arrangement being such that when said pressure in said pressure chamber is at or below said predetermine pressure said valve is in said first position to close said third passage and when said pressure in said pressure chamber exceeds said predetermined pressure said valve is moved to a second position against the bias of said spring and the fluid in said fluid chamber so as to cause the fluid in the pressure chamber to flow via said first passage and said third passage to said reservoir, said first passage being an orifice of a size that restricts the fluid in said fluid chamber from exiting therefrom quickly so that a shock absorber effect is provided while said valve moves from said first position to said second position.

4. The high pressure diaphragm pump of claim 3 wherein said valve is located in a valve holder member formed with a cylindrical skirt portion having radially extending holes adapted to provide communication between said second passage and said first and third passages when said valve is in said second position.

5. The high pressure diaphragm pump of claim 4 wherein said valve is formed with a centrally located and axially extending passage which connects with radially extending holes in said valve for connecting said passage with an annular groove formed in the outer surface of said valve.

6. The high pressure diaphragm pump of claim 5 wherein said sleeve has a roof portion closing one end of said sleeve and a ball valve is seated on said roof portion and adapted to open and close a passage in said piston member for connecting said reservoir with said opening in said sleeve.

7. The high pressure diaphragm pump of claim 6 wherein said plunger valve is formed with a head portion slidably located in said sleeve and has a stem extending from said head portion for connection with said diaphragm.

8. The high pressure diaphragm pump of claim 7 wherein said head portion and said stem are provided with a blind passage and said stem has holes formed therein connecting with said passage for connecting the area between said head portion and said roof portion with said pressure chamber.

9. The high pressure diaphragm pump of claim 8 wherein a coil spring is provided in said sleeve for continuously biasing said plunger valve towards said roof portion of said sleeve.

10. The high pressure diaphragm pump of claim 9 wherein said coil spring has one end thereof supported by said retainer and the other end thereof engages said head portion of the plunger valve.

* * * * *